United States Patent
Masuda et al.

(10) Patent No.: US 10,161,511 B2
(45) Date of Patent: Dec. 25, 2018

(54) AUTOMOTIVE TRANSMISSION CONTROL DEVICE

(71) Applicant: Hitachi Automotive Systems, Ltd., Hitachinaka-shi, Ibaraki (JP)

(72) Inventors: Kenji Masuda, Hitachinaka (JP); Satoru Okubo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/526,817

(22) PCT Filed: Oct. 28, 2015

(86) PCT No.: PCT/JP2015/080310
§ 371 (c)(1),
(2) Date: May 15, 2017

(87) PCT Pub. No.: WO2016/084539
PCT Pub. Date: Jun. 2, 2016

(65) Prior Publication Data
US 2017/0335955 A1     Nov. 23, 2017

(30) Foreign Application Priority Data
Nov. 28, 2014   (JP) ................. 2014-241112

(51) Int. Cl.
*F16H 61/12*     (2010.01)
*F16H 61/02*     (2006.01)
(Continued)

(52) U.S. Cl.
CPC ......... *F16H 61/12* (2013.01); *F16H 61/0213* (2013.01); *F16H 59/44* (2013.01);
(Continued)

(58) Field of Classification Search
CPC ...... F16H 61/12; F16H 59/70; F16H 61/0213; F16H 59/44; F16H 2061/1216; F16H 2061/1212
See application file for complete search history.

(56) References Cited

U.S. PATENT DOCUMENTS

| | | | |
|---|---|---|---|
| 5,601,513 A | 2/1997 | Arai et al. | |
| 6,056,669 A * | 5/2000 | Marshall | ................. F16H 59/12 340/456 |

(Continued)

FOREIGN PATENT DOCUMENTS

| | | |
|---|---|---|
| JP | 5-203036 A | 8/1993 |
| JP | 8-128522 A | 5/1996 |

(Continued)

OTHER PUBLICATIONS

International Search Report (PCT/ISA/210) issued in PCT Application No. PCT/JP2015/080310 dated Feb. 16, 2016 with English translation (Four (4) pages).

(Continued)

*Primary Examiner* — David J Hlavka
(74) *Attorney, Agent, or Firm* — Crowell & Moring LLP

(57) ABSTRACT

Provided is an automotive transmission control device in which a shift range signal can be generated as accurately as possible and control of vehicle travel can be maintained even when a signal input port for a computation device develops a fault. The automotive transmission control device according to the present invention: is provided with three input ports for receiving shift range signals; and provisionally determines the shift range state by the majority decision of the input ports, estimates the shift range state on the basis of the travel state of the vehicle, and performs a final determination of the shift range state by using both the provisional determination and the estimation.

15 Claims, 7 Drawing Sheets

(51) Int. Cl.
*F16H 59/44* (2006.01)
*F16H 59/70* (2006.01)

(52) U.S. Cl.
CPC ........ *F16H 59/70* (2013.01); *F16H 2061/122* (2013.01); *F16H 2061/1212* (2013.01); *F16H 2061/1216* (2013.01)

(56) References Cited

U.S. PATENT DOCUMENTS

| | | | |
|---|---|---|---|
| 6,366,839 B1 | 4/2002 | Sato | |
| 7,246,024 B2 * | 7/2007 | Muramatsu | ............. F01D 17/02 60/39.281 |
| 2004/0249541 A1 | 12/2004 | Kim | |
| 2008/0028879 A1 | 2/2008 | Robinette et al. | |
| 2008/0045376 A1 | 2/2008 | Kim | |
| 2009/0248233 A1 | 10/2009 | Yamada et al. | |
| 2010/0161187 A1 | 6/2010 | Ito | |

FOREIGN PATENT DOCUMENTS

| | | | |
|---|---|---|---|
| JP | 2000-29734 A | 1/2000 |
| JP | 2007-192337 A | 8/2007 |
| JP | 5158208 B2 | 3/2013 |
| JP | 2013-238259 A | 11/2013 |

OTHER PUBLICATIONS

Japanese-language Written Opinion (PCT/ISA/237) issued in PCT Application No. PCT/JP2015/080310 dated Feb. 16, 2016 (Four (4) pages).

* cited by examiner

AUTOMOTIVE TRANSMISSION CONTROL DEVICE

TECHNICAL FIELD

The present invention relates to a device for controlling an automatic transmission mounted on a vehicle.

BACKGROUND ART

Generally, a vehicle control device includes a microcomputer that executes processing for controlling a vehicle. If the microcomputer fails, the control processing is not normally executed and this results in disrupting an operation of the vehicle. For this reason, it is necessary to appropriately inspect the failure of the microcomputer.

A control device described in PTL 1 includes a first microcomputer and a second microcomputer and the first microcomputer and the second microcomputer monitor abnormalities of partner sides. Each of the first microcomputer and the second microcomputer includes a reception buffer to receive an operation value of the partner side and compares a self operation value and the operation value of the partner side. As a comparison result, when the self operation value and the operation value of the partner side are different from each other, it is determined that at least one of the first microcomputer and the second microcomputer is abnormal.

CITATION LIST

Patent Literature

PTL 1: JP 2013-238259 A

SUMMARY OF INVENTION

Technical Problem

According to technology described in PTL 1, when a body of the microcomputer fails, it is detected that the body of the microcomputer fails. However, it is thought that it is assumed that a signal input to the microcomputer is normal, in the same document. Therefore, when any signal input port of the first and second microcomputers fails, it becomes difficult to appropriately determine a shift position (shift range) to be a control target in the same document.

A signal showing a state of the shift range is a most significant input necessary for controlling vehicle travel. For this reason, if the shift range cannot be appropriately determined, an input signal having a high degree of influence becomes defective and the vehicle travel cannot be controlled. In addition, if the vehicle cannot travel, it becomes difficult to move the vehicle to a dealer to request repair.

The present invention has been made in view of the above problems and an object of the present invention is to provide an automotive transmission control device in which a shift range signal can be generated as accurately as possible and control of vehicle travel can be maintained, even when a signal input port for an operation device fails.

Solution to Problem

An automotive transmission control device according to the present invention includes three input ports to receive shift range signals and provisionally determines a shift range state by the majority decision of the three input ports, estimates the shift range state on the basis of a travel state of a vehicle, and finally determines the shift range state by using both the provisional determination and the estimation.

Advantageous Effects of Invention

According to an automotive transmission control device according to the present invention, even when an input port fails, a shift range state can be appropriately determined and control of vehicle travel can be maintained.

DESCRIPTION OF EMBODIMENTS

<Configuration of Embodiment of Present Invention>

Figure 1:
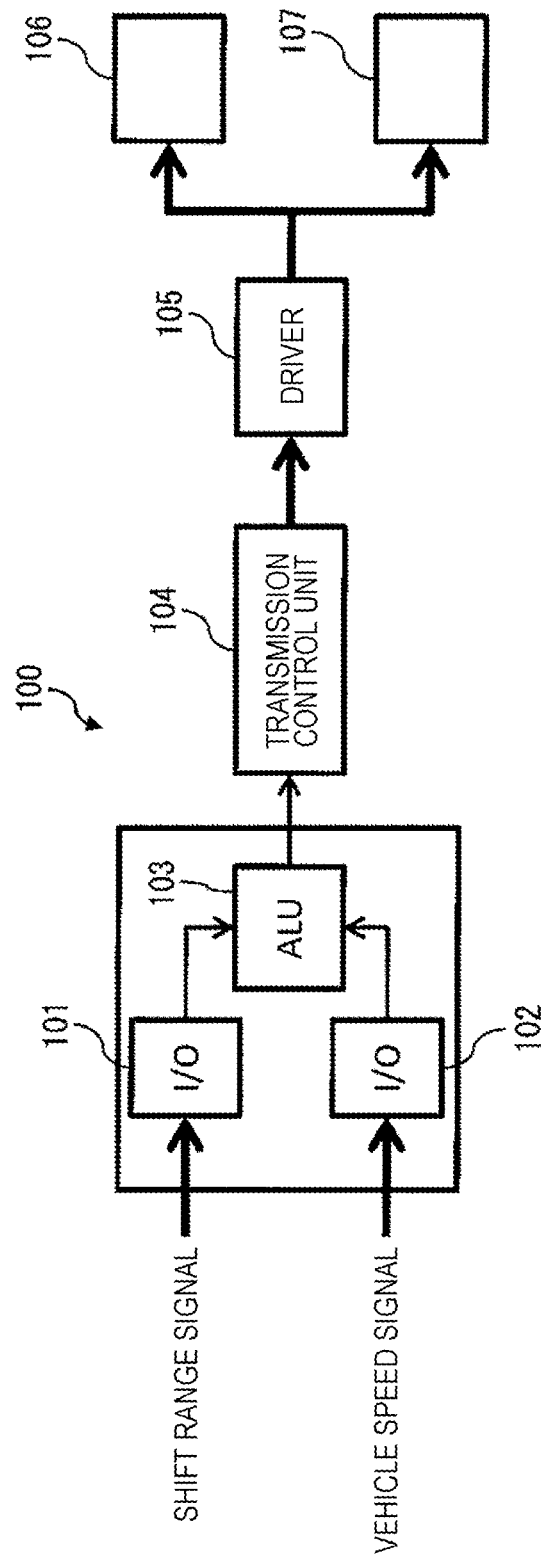
FIG. 1 is a functional block diagram of a general automotive transmission control device 100.

FIG. 1 is a functional block diagram of a general automotive transmission control device 100. Microcomputer input ports included in input circuits 101 and 102 receive signals such as a shift range signal showing a state of a shift range and a vehicle speed signal transmitted by a vehicle speed sensor. An arithmetic logic unit (ALU) executes arithmetic processing such as four basic arithmetic operations and logical operations for the signals and generates control data. A transmission control unit 104 generates a control signal for a driver 105 using the control data. The driver 105 controls driving of a linear solenoid 106 or a car area network (CAN) controller 107. The linear solenoid 106 controls a clutch hydraulic pressure which an automatic transmission uses at the time of executing a shift operation. The CAN controller 107 performs communication with other control device (for example, an engine control device) using a CAN protocol.

If the input circuit 101 or 102 fails, a signal input to the automotive transmission control device 100 becomes abnormal. In this case, even though a body of the automotive transmission control device 100 operates normally, an output control signal becomes abnormal. At this time, because the body of the automotive transmission control device 100 is normal, it may not be detected that the control signal is abnormal, even when the method described in PTL 1 is used. To avoid the above circumstances, the present invention provides technology for detecting abnormalities of the input ports and maintaining appropriate control processing.

Figure 2:
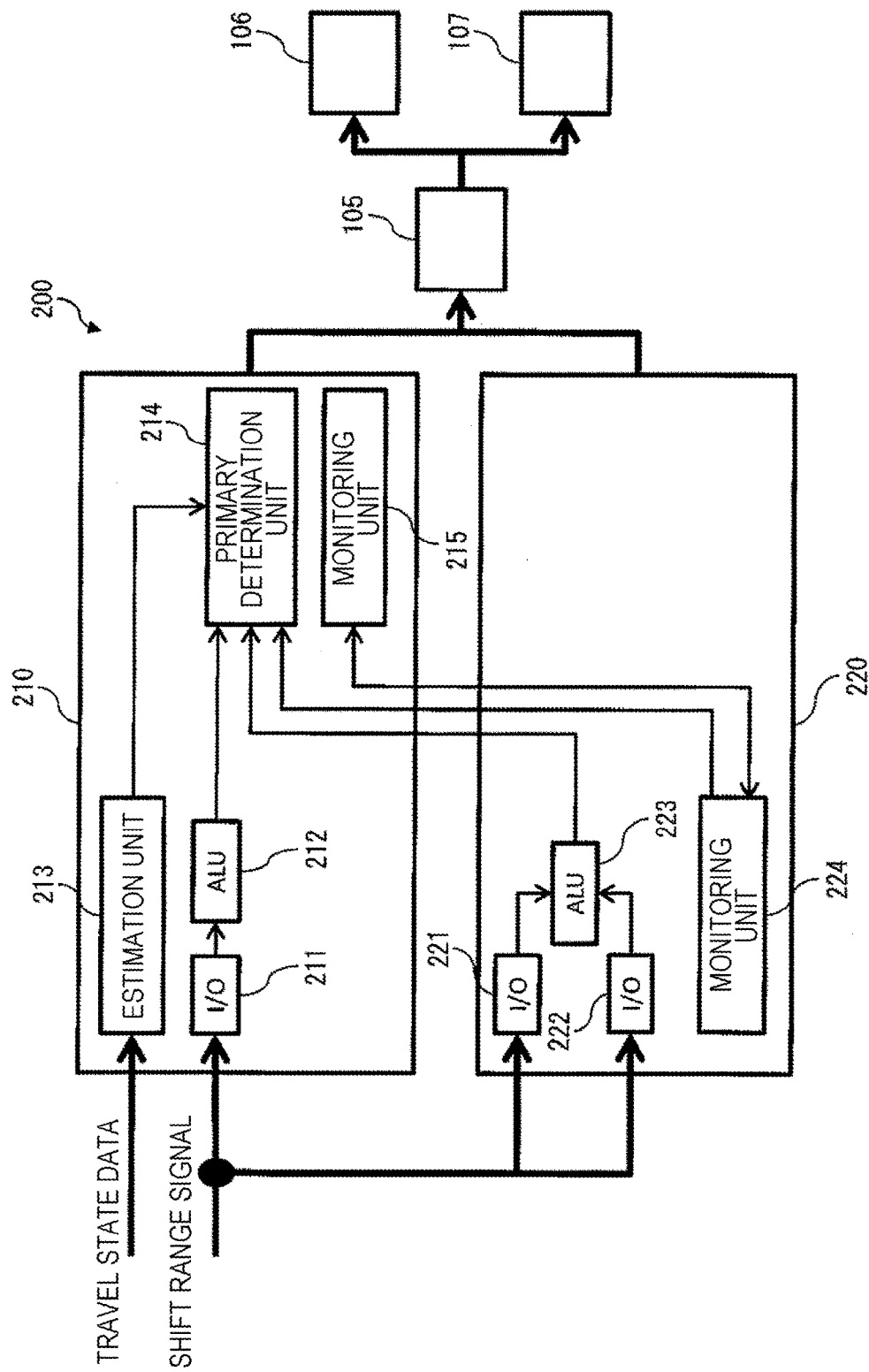
FIG. 2 is a functional block diagram of an automotive transmission control device 200.

FIG. 2 is a functional block diagram of an automotive transmission control device 200 according to the present invention. The automotive transmission control device 200 is a device that outputs the control signal for the driver 105 described in FIG. 1 and controls the linear solenoid 106 and the CAN controller 107. The automotive transmission control device 200 includes a first operation device 210 and a second operation device 220 and the individual operation devices can perform communication with each other.

The CAN controller 107 periodically exchanges data such as an engine speed, a vehicle speed, and acceleration with other control device. An estimation unit 213 can use the data as travel state data showing a travel state of the vehicle.

The first operation device 210 is an operation device such as a microcomputer to execute a control operation and generate a control signal for the driver 105 and includes a first input circuit 211, an ALU 212, an estimation unit 213, a primary determination unit 214, and a monitoring unit 215.

The first input circuit 211 is a signal input port that receives a shift range signal showing a shift range state. The ALU 212 executes predetermined processing for the signal received by the first input circuit 211 and outputs the signal to the primary determination unit 214. The estimation unit 213 estimates a current shift range state, on the basis of travel state data of the vehicle. The primary determination unit 214 provisionally determines the current shift range state, on the basis of the shift range signal. In addition, the primary determination unit 214 finally determines the shift range state, on the basis of an estimation result by the estimation unit 213 and a self provisional determination result. The monitoring unit 215 replies to an inquiry about whether the first operation device 210 normally operates. Detailed operations of the estimation unit 213, the primary determination unit 214, and the monitoring unit 215 will be described later.

The second operation device 220 includes a second input circuit 221, a third input circuit 222, an ALU 223, and a monitoring unit 224. The second input circuit 221 and the third input circuit 222 are signal input ports that receive shift range signals in parallel to the first input circuit 211. The ALU 223 executes predetermined processing for the signals received by the second input circuit 221 and the second input circuit 223 and outputs the signals to the primary determination unit 214. The monitoring unit 224 monitors whether the first operation device 210 normally operates.

In FIG. 2, the second input circuit 221 and the third input circuit 222 are provided on the second operation device 220. However, one of the second input circuit 221 and the third input circuit 222 or both the second input circuit 221 and the third input circuit 222 may be provided on the first operation device 210. That is, the first operation device 210 that generates the control signal for the driver 105 may finally receive the shift range signals from the three signal input ports.

Figure 3:
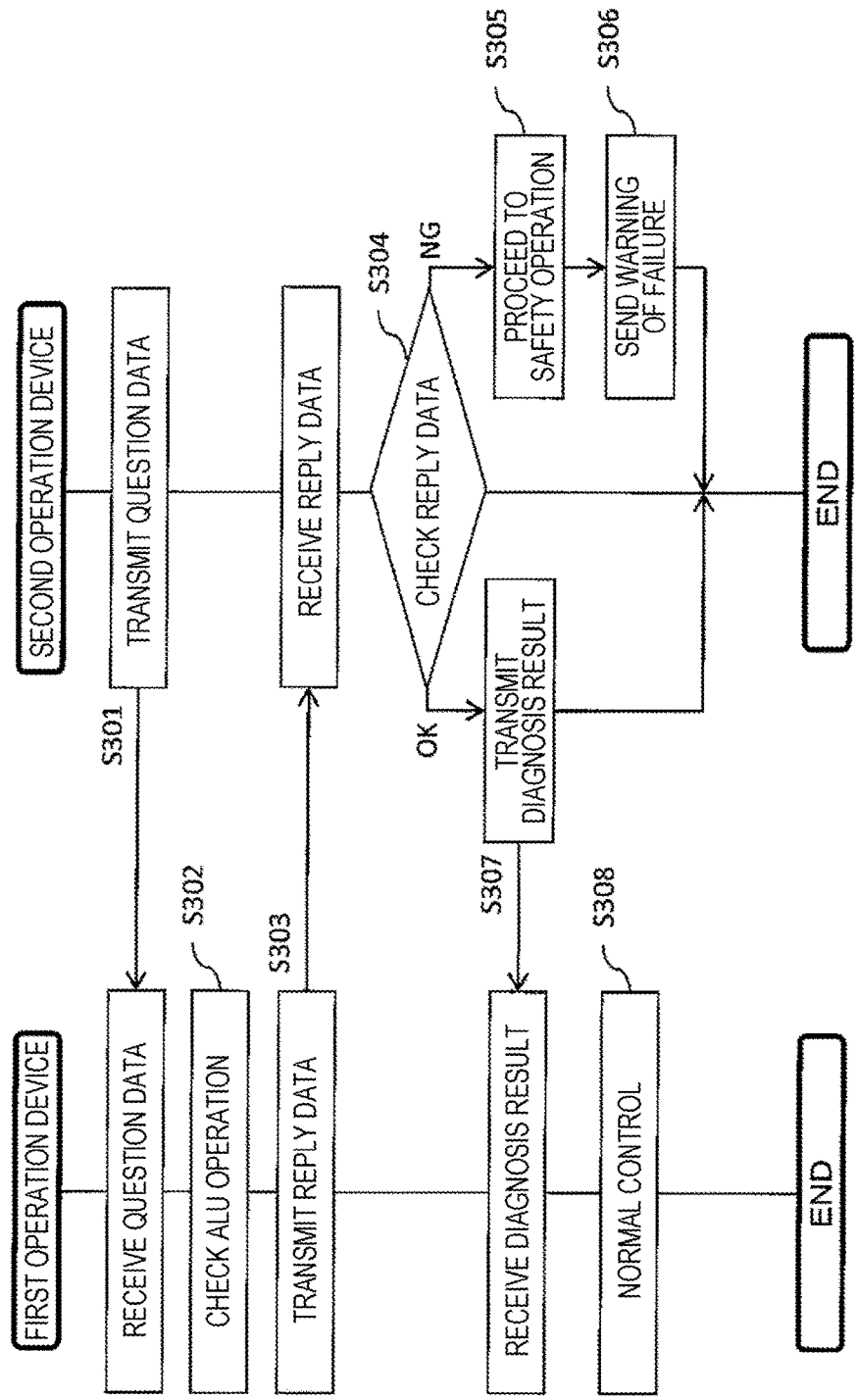
FIG. 3 is a sequence diagram illustrating a sequence in which monitoring units 215 and 224 monitor an operation of a first operation device 210.

FIG. 3 is a sequence diagram illustrating a sequence in which the monitoring units 215 and 224 monitor an operation of the first operation device 210. The present sequence may be executed periodically in the background and may be executed before executing flowcharts after FIG. 4 to be described later. Hereinafter, individual steps of FIG. 3 will be described.

(FIG. 3: Step S301)

The monitoring unit 224 transmits any data stream (question data) used to determine whether the first operation device 210 normally operates to the monitoring unit 215. The monitoring unit 215 receives the question data.

(FIG. 3: Step S302)

The monitoring unit 215 generates predetermined reply data (for example, a data stream obtained by inverting bits of the question data) for the question data. In addition, the monitoring unit 215 checks whether the ALU 212 normally operates, with respect to all arithmetic operations such as four basic arithmetic operations and logical operations used by the first operation device 210. For example, the operation of the ALU 212 can be checked by whether a result of processing using a certain arithmetic command is matched with a previously stored expectation result.

(FIG. 3: Step S303)

The monitoring unit 215 initializes the reply data, when it is determined in step S302 that the ALU 212 does not normally operate. The monitoring unit 215 transmits the reply data to the monitoring unit 224. The monitoring unit 224 receives the reply data.

(FIG. 3: Step S304)

The monitoring unit 224 compares the received reply data with previously stored expected reply data. When both the data are matched with each other, it is determined that the first operation device 210 normally operates and the process proceeds to step S307. When both the data are not matched with each other, it is determined that the first operation device 210 abnormally operates and the process proceeds to step S305.

(FIG. 3: Step S305)

The monitoring unit 224 generates a control signal to command a change of the shift range to N (neutral) to cause an operation to proceed to an operation for moving the vehicle to a safety side. The driver 105 controls the linear solenoid 106 according to the control signal and changes the shift range to N. In addition, the monitoring unit 224 generates a control signal to leave only a data ID for an abnormality notification and stop other CAN communication, to prevent wrong data from being transmitted from the CAN controller 107 to other control device. The driver 105 controls the CAN controller 107 according to the control signal.

(FIG. 3: Step S306)

The monitoring unit 224 sends a warning that the first operation device 210 does not normally operate, via the CAN controller 107. Specifically, data in which the warning is described is transmitted by the CAN communication using the data ID left in step S305. Also, warnings in flowcharts to be described later can be sent using the same method.

(FIG. 3: Steps S307 and S308)

The monitoring unit 224 transmits a diagnosis result in step S304 to the monitoring unit 215 and the monitoring unit 215 receives the diagnosis result (S307). The monitoring unit 215 confirms that the diagnosis result is normal and the first operation device 210 executes normal control.

Figure 4:
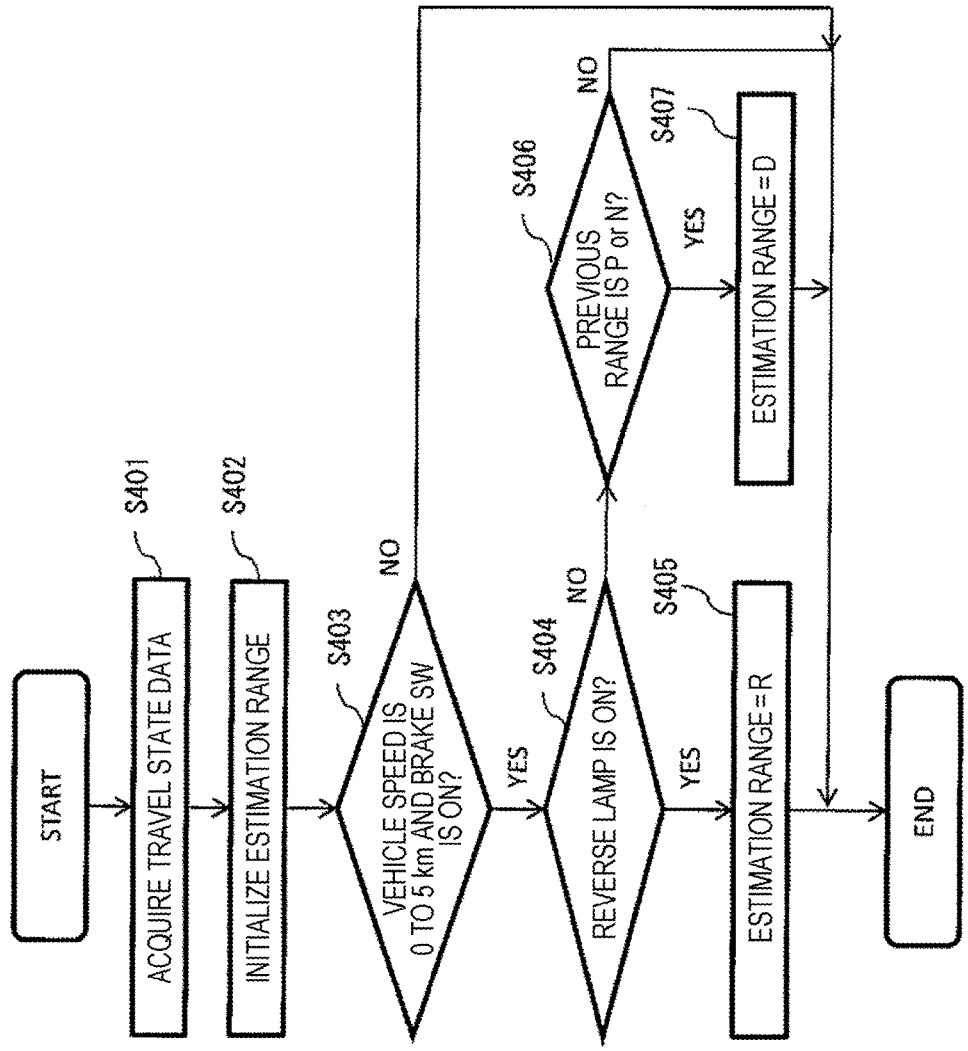
FIG. 4 is an operation flowchart of an estimation unit 213.

FIG. 4 is an operation flowchart of the estimation unit 213. The estimation unit 213 starts the present flowchart when the shift range changes (the shift range signal changes to a value different from a previous value). It is assumed that the present flowchart is executed only when the shift range changes to R (reverse) or D (drive). Hereinafter, individual steps of FIG. 4 will be described.

(FIG. 4: Steps S401 and S402)

The estimation unit 213 receives travel state data from other control device via the CAN controller 107 (S401) and initializes an estimation result of the shift range (S402). The travel state data describes a speed of a vehicle detected by a vehicle speed sensor, a brake SW value showing an ON/OFF state of a brake switch, and a reverse lamp value showing whether the vehicle travels in reverse, for example. These data are used in the following steps.

(FIG. 4: Step S403)

The estimation unit 213 determines whether the vehicle speed is 0 to 5 km and the brake switch is in the ON state. When these conditions are not satisfied, it is thought that the shift range does not change to R or D, that is, the shift range changes to P (parking) or N. For this reason, it is assumed that it is not necessary to determine the shift range precisely. Therefore, the estimation unit 213 ends the present flowchart without executing the following steps. When these conditions are satisfied, the process proceeds to step S404.

(FIG. 4: Steps S404 and S405)

The estimation unit 213 determines whether a reverse lamp is ON (S404). When the reverse lamp is ON, it is estimated that the shift range changes to R (S405). Otherwise, the process proceeds to step S406.

(FIG. 4: Steps S406 and S407)

The estimation unit 213 confirms a previous state of the shift range. When the previous state is the P range or the N range, it is estimated that the shift range changes to D (S407). Otherwise, it is thought that the shift range changes to P or N. For this reason, the present flowchart ends, similarly to step S403.

Figure 5:
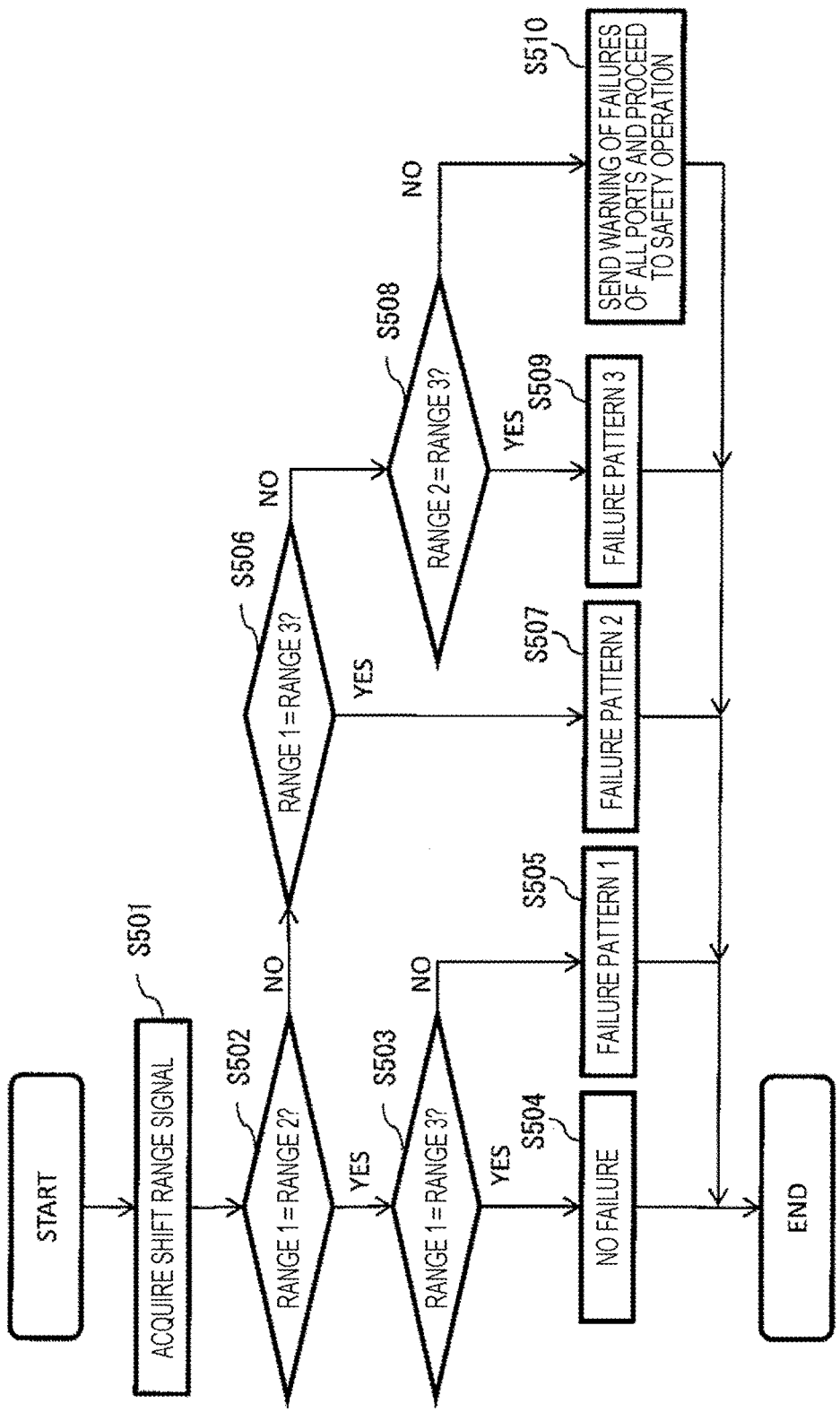
FIG. 5 is a flowchart illustrating processing for provisionally determining a current state of a shift range by a primary determination unit 214, on the basis of shift range signals.

FIG. 5 is a flowchart illustrating processing for provisionally determining a current state of the shift range by the primary determination unit 214, on the basis of the shift range signals. The primary determination unit 214 starts the present flowchart when the shift range changes. Hereinafter, individual steps of FIG. 5 will be described.

(FIG. 5: Step S501)

The primary determination unit 214 acquires the shift range signals from the first input circuit 211, the second input circuit 221, and the third input circuit 222. In the following steps of FIG. 5, the shift range signal acquired from the first input circuit 211 is written as a range 1, the shift range signal acquired from the second input circuit 221 is written as a range 2, and the shift range signal acquired from the third input circuit 222 is written as a range 3.

(FIG. 5: Steps S502 to S509)

The primary determination unit 214 provisionally determines a current state of the shift range by the majority decision of the shift range signals acquired from the individual input circuits. When all of the shift range signals show the same shift range state, it is determined that the individual input circuits do not fail (S504). When any one shift range signal is different from the remaining two shift range signals, it is determined that the input circuit acquiring one shift range signal fails and it is determined that the remaining two shift range signals are normal (S505, S507, and S509).

(FIG. 5: Step S510)

When all of the shift range signals show different shift range states, respectively, the primary determination unit 214 determines that all of the input circuits fail. The primary determination unit 214 generates the same control signal as the control signal generated by the monitoring unit 224 in step S305, to cause an operation to proceed to an operation for moving the vehicle to a safety side.

Figure 6:
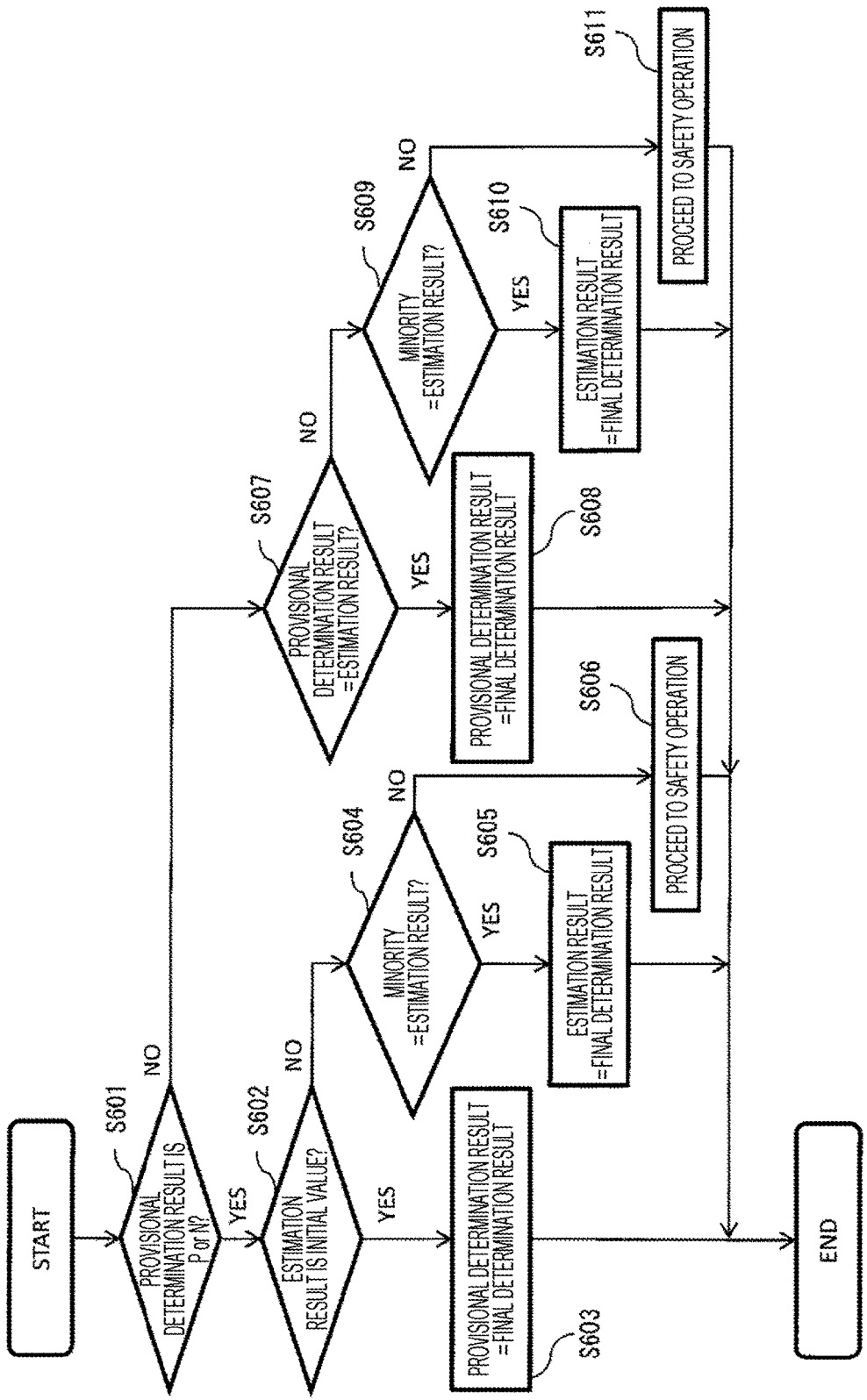
FIG. 6 is a flowchart illustrating processing for finally determining the current state of the shift range by the primary determination unit 214.

FIG. 6 is a flowchart illustrating processing for finally determining the current state of the shift range by the primary determination unit 214. The present flowchart is executed after the flowchart of FIG. 5 is executed. Hereinafter, individual steps of FIG. 6 will be described.

(FIG. 6: Step S601)

The primary determination unit 214 confirms whether the provisional determination result of the shift range state by the flowchart of FIG. 5 is the P range or the N range. When the provisional determination result is any one of the P range and the N range, the process proceeds to step S602. Otherwise, the process proceeds to step S607.

(FIG. 6: Step S601: Complement)

The primary determination unit 214 finally determines the current state of the shift range by using both the provisional determination result and the estimation result by the estimation unit 213 in the following steps. However, when the provisional determination result is the P range or the N range, the flowchart ends without estimating the shift range in step S403 or S406 of FIG. 4. For this reason, the estimation is not executed. Therefore, division of the cases is performed on the basis of the provisional determination result in the present step.

(FIG. 6: Steps S602 and S603)

The primary determination unit 214 determines whether the estimation result by the estimation unit 213 is an initial value (that is, there is not the estimation result) (S602). When the estimation result is the initial value, the provisional determination result is used as a final determination result of the shift range state (S603) and when the estimation result is not the initial value, the process proceeds to step S604.

(FIG. 6: Steps S604 and S605)

The primary determination unit 214 determines whether a minority in the majority decision of the shift range signals acquired from the individual input circuits and the estimation result by the estimation unit 213 are matched with each other (S604). When the minority and the estimation result are matched with each other, it is thought that two (that is, two to be a majority) of the input circuits fail and the remainder is normal. For this reason, the estimation result by the estimation unit 213 is used as the final determination result of the shift range state (S605). When the minority and the estimation result are not matched with each other, the process proceeds to step S606.

(FIG. 6: Step S606)

When the flowchart reaches the present step, the following conditions are satisfied. (a) The provisional determination result is the P range or the N range. (b) According to the flowchart of FIG. 4, when the estimation result is not the initial value (there is the estimation result), the estimation result is the R range or the D range. (c) By step S604, (c1) the minority of the input circuits is different from the majority and is different from the estimation result or (c2) all of the input circuits in the majority decision are the P range or the N range and are different from the estimation result. Accordingly, because (a) the majority in the provisional determination result, (b) the estimation result, and (c) the minority in the provisional determination result or all of the input circuits show different shift range states, respectively, it is thought that the vehicle state is abnormal and the travel cannot be maintained. Therefore, the primary determination unit 214 generates the same control signal as the control signal generated by the monitoring unit 224 in step S305, to cause an operation to proceed to an operation for moving the vehicle to a safety side. The final determination result of the shift range state becomes the N range.

(FIG. 6: Steps S607 and S608)

The primary determination unit 214 determines whether the provisional determination result and the estimation result by the estimation unit 213 are matched with each other (S607). When the provisional determination result and the estimation result are matched with each other, it is thought that the provisional determination result is normal. For this reason, the provisional determination result is used as the final determination result of the shift range state (S608). When the provisional determination result and the estimation result are not matched with each other, the process proceeds to step S609.

(FIG. 6: Steps S609 and S610)

Similarly to step S604, the primary determination unit 214 determines whether the minority in the majority decision of the shift range signals acquired from the individual input circuits and the estimation result by the estimation unit 213 are matched with each other (S609). When the minority and the estimation result are matched with each other, the estimation result by the estimation unit 213 is used as the final determination result of the shift range state (S610). When the minority and the estimation result are not matched with each other, the process proceeds to step S611. The determination basis is the same as those in steps S604 and S605.

(FIG. 6: Step S611)

When the flowchart reaches the present step, the following conditions are satisfied. (a) The provisional determination result is the D range or the R range. (b) By step S607, the provisional determination result and the estimation result are different from each other. (c) By step S609, (c1) the minority of the input circuits is different from the majority and is different from the estimation result or (c2) all of the input circuits in the majority decision are the D range or the R range and are different from the estimation result. Accordingly, because (a) the majority in the provisional determination result, (b) the estimation result, and (c) the minority in the provisional determination result or all of the input circuits show different shift range states, respectively, the primary determination unit 214 generates the same control signal as the control signal in step S606. The final determination result of the shift range state becomes the N range.

Figure 7:
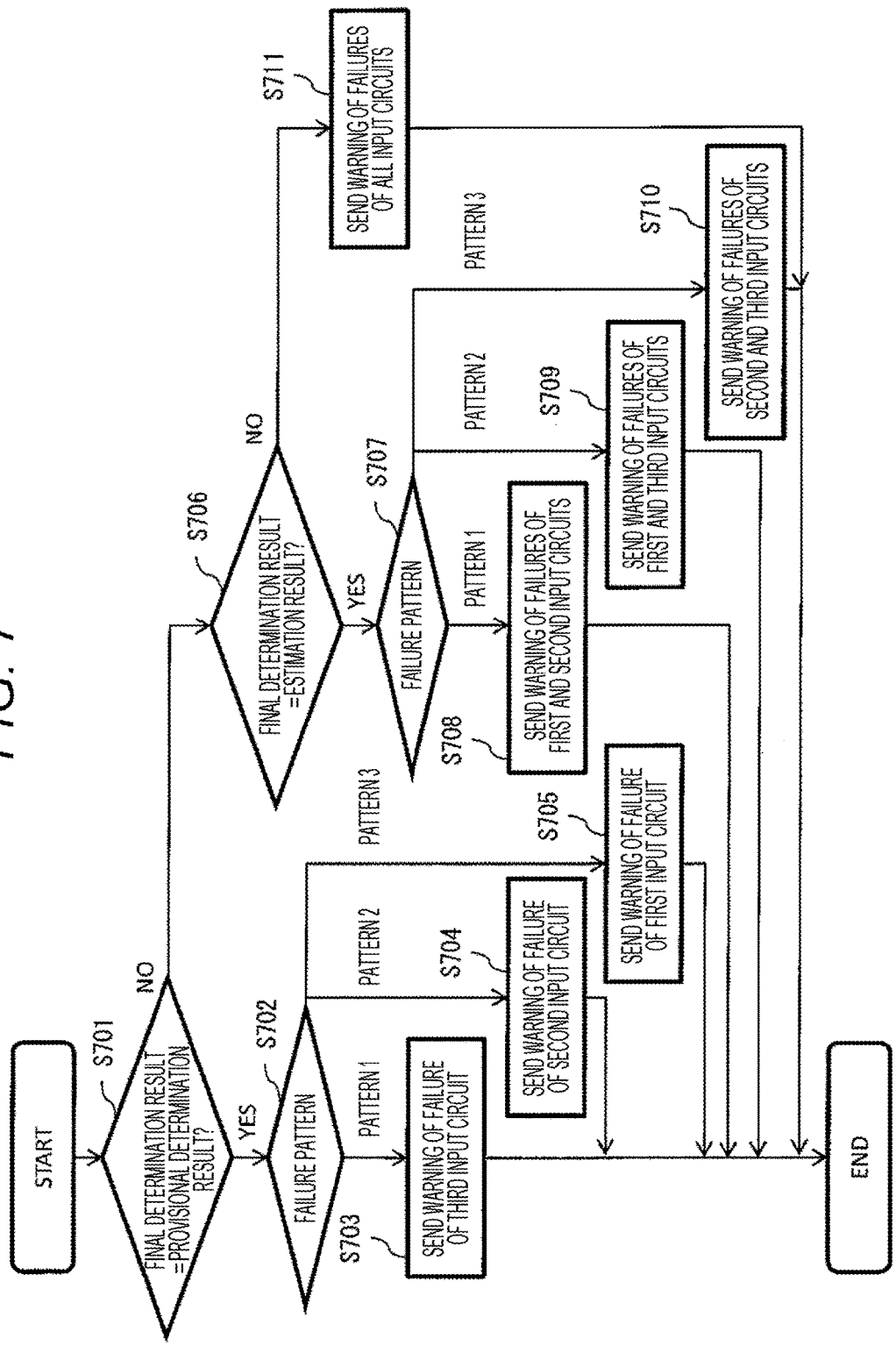
FIG. 7 is a flowchart illustrating processing for determining a failing input circuit among individual input circuits by the primary determination unit 214.

FIG. 7 is a flowchart illustrating processing for determining a failing input circuit among the input circuits by the primary determination unit 214. The present flowchart is executed after the flowchart of FIG. 6 is executed. Hereinafter, individual steps of FIG. 7 will be described.

(FIG. 7: Steps S701 to S705)

The primary determination unit 214 determines whether the final determination result of the shift range state obtained by the flowchart of FIG. 6 and the provisional determination result are matched with each other (S701). When the final determination result and the provisional determination result are not matched with each other, the process proceeds to step S706. When the final determination result and the provisional determination result are matched with each other, the failing input circuit is specified according to the failure pattern determined by the flowchart of FIG. 5 and a warning that the input circuit fails is sent (S702 to S705). When it is determined in the flowchart of FIG. 5 that there is no failure, the warning is not sent.

(FIG. 7: Steps S701 to S705: Determination Example)

For example, when it is determined that a failure pattern 1 is generated in the flowchart of FIG. 5 (S505), the shift range signal of the first input circuit 211 and the shift range signal of the second input circuit 221 are matched with each other and the shift range signal of the third input circuit 222 is not matched with these shift range signals. Therefore, according to the majority decision, it is assumed that the first input circuit 211 and the second input circuit 221 are normal and the third input circuit 222 fails. Step S703 corresponds to this.

(FIG. 7: Steps S706 to S710)

The primary determination unit 214 determines whether the final determination result of the shift range state obtained by the flowchart of FIG. 6 and the estimation result by the estimation unit 213 are matched with each other (S706). When the final determination result and the estimation result are not matched with each other, the process proceeds to step S711. When the final determination result and the estimation result are matched with each other, the failing input circuit is specified according to the failure pattern determined by the flowchart of FIG. 5 and a warning that the input circuit fails is sent (S707 to S710).

(FIG. 7: Steps S706 to S710: First Determination Example)

For example, when it is determined in the flowchart of FIG. 5 that the failure pattern 1 is generated (S505) and when it is determined in step S706 that the final determination result and the estimation result are matched with each other, the following conditions are satisfied. (a) According to the flowchart of FIG. 4, when there is the estimation result, the estimation result is the R range or the D range. (b) By step S706, the final determination result and the estimation result are matched with each other. (c) According to steps S604 and S605 or steps S609 and S610 of FIG. 6, when the estimation result and the final determination result are matched with each other, the estimation result and the minority in the majority decision are matched with each other. Therefore, it is thought that the final determination result, the estimation result, and the minority in the majority decision are matched with each other and the input circuits of the majority in the majority decision fail. In the failure pattern 1, because the first input circuit 211 and the second input circuit 221 are the majority, the primary determination unit 214 determines that the input circuits fail and sends a warning that the input circuits fail.

(FIG. 7: Steps S706 to S710: Second Determination Example)

When all of the final determination result, the provisional determination result, and the estimation result show different shift range states, respectively, it is thought that the vehicle state is abnormal and the travel cannot be maintained. In this case, the process proceeds to step S711 after step S706. This corresponds to step S606 or S611 of FIG. 6.

(FIG. 7: Step S711)

The primary determination unit 214 determines that all of the input circuits fail and sends a warning that the all of the input circuits fail.

Summary of Present Invention

The automotive transmission control device 200 according to the present invention finally determines the shift range state by using both the result obtained by provisionally determining the shift range state on the basis of the shift range signals and the result obtained by estimating the shift range state on the basis of the travel state data. As a result, even when the input circuit fails, an appropriate control signal can be generated.

When the provisional determination result and the estimation result are not matched with each other, the automotive transmission control device 200 according to the present invention determines the shift range state on the basis of the estimation result, compares the result of the majority decision of the input circuits and the estimation result, and specifies the failing input circuit. As a result, a shift range control signal can be appropriately generated and a failure place of the input port can be specified and appropriate measures can be taken.

Modifications of Present Invention

The present invention is not limited to the embodiments described above and various modifications are included in the present invention. The embodiments are described in detail to facilitate the understanding of the present invention and the present invention is not limited to embodiments in which all of the described configurations are included. In addition, a part of the configurations of the certain embodiment can be replaced by the configurations of another embodiment. In addition, the configurations of another embodiment can be added to the configurations of the certain embodiment. In addition, for a part of the configurations of the individual embodiments, addition, removal, and replacement of other configurations can be performed.

The estimation logic described in FIG. 4 and the determination logics described in FIGS. 5 to 7 may be mounted such that the same determination tables as the logics are provided and the same processing is executed according to descriptions of the tables.

In the embodiments described above, the automotive transmission control device 200 is described as a mounting example. However, the same configuration as the configuration of the present invention can be adopted in other control device capable of using both the provisional determination result by the majority decision of the input ports and the estimation result based on the travel state data.

A part or all of the individual configurations, functions, processing units, and processing mechanisms may be designed by integrated circuits and may be realized by hardware. In addition, the individual configurations and functions may be realized by software by analyzing programs for realizing the functions by a processor and executing the programs by the processor. Information such as the programs for realizing the individual functions, the tables, and the files may be stored in a recording device such as a memory, a hard disk, and a solid state drive (SSD) and a recording medium such as an IC card, an SD card, and a DVD.

Data Table

REFERENCE SIGNS LIST 105 driver
106 linear solenoid
107 CAN controller
200 automotive transmission control device
210 first operation device
211 first input circuit
212 ALU
213 estimation unit
214 primary determination unit
215 monitoring unit
220 second operation device
221 second input circuit
222 third input circuit
223 ALU
224 monitoring unit

The invention claimed is:

1. An automotive transmission control device for controlling a transmission mounted on a vehicle, comprising:
a first operation device which determines a first state of a shift range of the transmission; and
first, second, and third input circuits which each receive shift range signals showing shift range states of the transmission and each output respective shift range signals to the first operation device,
wherein the first operation device includes a primary determination unit which provisionally determines the state of the shift range of the transmission by a majority decision of the shift range signals received from the first, second, and third input circuits and an estimation unit which receives travel state data showing a travel state of the vehicle and estimates the state of the shift range of the transmission on the basis of the travel state shown by the travel state data, and
the primary determination unit determines abnormality of the state of the shift range of the transmission in the majority decision, by using both a result of the provisional determination and a result of the estimation.

2. The automotive transmission control device according to claim 1,
when the shift range of the transmission is in a second state, the primary determination unit further executes an initial state determination to determine whether there is the result of the estimation, and
when there is not the result of the estimation in the initial state determination, the primary determination unit uses the result of the provisional determination as a final determination result of the shift range of the transmission.

3. The automotive transmission control device according to claim 2, wherein
when there is the result of the estimation in the initial state determination, the primary determination unit further executes a minority determination to determine whether a minority in the majority decision among the first, second, and third input circuits and the result of the estimation are matched with each other, and
when the minority in the majority decision and the result of the estimation are matched with each other in the minority determination, the primary determination unit uses the result of the estimation as the final determination result of the shift range of the transmission.

4. The automotive transmission control device according to claim 3, wherein
when the minority in the majority decision and the result of the estimation are not matched with each other in the minority determination, the primary determination unit compulsorily sets the shift range of the transmission to a neutral state and stops communication other than an error notification from a mechanism for driving the transmission and the automotive transmission control device to other control device.

5. The automotive transmission control device according to claim 1, wherein
when the shift range of the transmission is in the travel state of the transmission in the provisional determination, the primary determination unit further executes a matching determination to determine whether the result of the estimation and the result of the provisional determination are matched with each other, and
when the result of the estimation and the result of the provisional determination are matched with each other in the matching determination, the primary determination unit uses the result of the provisional determination as a final determination result of the shift range of the transmission.

6. The automotive transmission control device according to claim 5, wherein
when the result of the estimation and the result of the provisional determination are not matched with each other in the matching determination, the primary determination unit further executes a minority determination to determine whether a minority in the majority decision among the first, second, and third input circuits and the result of the estimation are matched with each other, and
when the minority in the majority decision and the result of the estimation are matched with each other in the minority determination, the primary determination unit uses the result of the estimation as the final determination result of the shift range of the transmission.

7. The automotive transmission control device according to claim 6, wherein
when the minority in the majority decision and the result of the estimation are not matched with each other in the minority determination, the primary determination unit compulsorily sets the shift range of the transmission to a neutral state and stops communication other than an error notification from a mechanism for driving the transmission and the automotive transmission control device to other control device.

8. The automotive transmission control device according to claim 1, wherein
when a final determination result and the result of the provisional determination are matched with each other, the primary determination unit issues a warning that a minority in the majority decision among the first, second, and third input circuits fails.

9. The automotive transmission control device according to claim 1, wherein
when the result of the provisional determination of final determination result is not matched, the primary determination unit further executes an estimation result determination to determine whether the final determination result and the result of the estimation are matched with each other, and
when the final determination result and the result of the estimation are matched with each other in the estimation result determination, the primary determination unit issues a warning that the two input circuits to be a majority in the majority decision among the first, second, and third input circuits fail.

10. The automotive transmission control device according to claim 9, wherein
when the final determination result and the result of the estimation are not matched with each other in the estimation result determination, the primary determination unit issues a warning that all of the first, second, and third input circuits fail.

11. The automotive transmission control device according to claim 1, wherein
when all of the shift range states shown by the shift range signals received from the first, second, and third input circuits are different, the primary determination unit issues a warning that all of the first, second, and third input circuits fail and compulsorily sets the shift range of the transmission to a neutral state, and
the primary determination unit stops communication other than an error notification from a mechanism for driving the transmission and the automotive transmission control device to other control device.

12. The automotive transmission control device according to claim 1, further comprising:
a second operation device which is connected to the first operation device to enable communication,
wherein the second operation device includes a monitoring unit which monitors whether the first operation device normally operates, and
when the first operation device does not normally operate, the monitoring unit issues a warning that the first operation device does not normally operate, compulsorily sets the shift range of the transmission to a neutral state, and stops communication other than an error notification from a mechanism for driving the transmission and the automotive transmission control device to other control device.

13. The automotive transmission control device according to claim 12, wherein
the monitoring unit transmits question data to request a reply to the first operation device, and
if the question data is received, the first operation device inspects whether an internal arithmetic logic unit normally operates, returns predetermined reply data to the question data to the monitoring unit, when the internal arithmetic logic unit normally operates, and returns a fact that the internal arithmetic logic unit does not normally operate, when the internal arithmetic logic unit does not normally operate.

14. The automotive transmission control device according to claim 1, wherein
the primary determination unit executes the provisional determination when one of the shift range signals that is received by at least one of the first, second, and third input circuits changes from a previous value, and
the estimation unit executes the estimation when the one of the shift range signals that is received by at least one of the first, second, and third input circuits changes from the previous value.

15. The automotive transmission control device according to claim 1, wherein
each of the first, second, and third input circuits is an input port which inputs a signal to at least one of the first operation device and the second operation device, and
when the second operation device receives one of the shift range signals, the first operation device acquires the one of the shift range signals from the second operation device.

* * * * *